Figure 1:
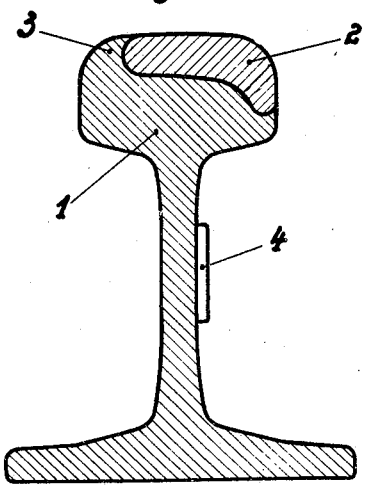

July 14, 1931.  H. KURZ  1,814,476
RAIL STRUCTURE
Filed April 4, 1930

Inventor:
H. Kurz
By: Marks &...
Attys.

Patented July 14, 1931

1,814,476

UNITED STATES PATENT OFFICE

HEINRICH KURZ, OF DUISBURG-RUHRORT, GERMANY, ASSIGNOR TO THE FIRM VEREINIGTE STAHLWERKE, AKTIENGESELLSCHAFT, OF DUSSELDORF, GERMANY

RAIL STRUCTURE

Application filed April 4, 1930, Serial No. 441,622, and in Germany May 4, 1929.

Up to now rails composed of hard and soft steel have been constructed in such a way that the head of the rail is formed of wear resisting hard steel, whereas the foot as well as the web portion consists of soft steel, the merging zone between the hard steel and the soft steel lying about at the point where the web portion merges into the head of the rail. In rails of this type, wherein the hard steel possesses a strength of about 100 to 150 kg., the soft steel, however, a strength of only 45 to 55 kg., the particularly undesirable disadvantage has been experienced that in welding the joints of such rails only the soft steel will weld properly, whereas the hard steel, even when the known welding sheets, to be inserted into the joints, are being used, will weld very unsatisfactorily.

Moreover, these rails have the further disadvantage that in bending the rails, the hard steel becomes separated from the soft steel as a result of the position of the merging zone, whereby cracks are liable to occur in the hard steel.

It is the object of the present invention to avoid the said disadvantage by having the soft steel, forming the lower part of the head of the rail, extended along the outer surfaces of the head or of parts of the head in the shape of a web up to the upper edges of the head of the rail thus embracing the hard steel which forms only the wearing zone. The zones of hard steel, in this case, are made of a size as small as the wear to which the rails are subjected in actual service will allow, whereas a very large part of the head of the rail will be composed of soft steel.

From the foregoing it will be seen that, whereas the rails of the presently known type, in spite of the insertion of the welding sheets as well as the use of large quantities of heat, could not be welded in a satisfactory way due to the relatively large mass of the hard steel with its poor welding properties, the fact that a large part of the cross sectional area of the head consists of soft steel, makes it possible to secure, without the consumption of large quantities of heat, a satisfactory welding of the heads of the rails as a result of the bette. welding properties of the soft steel.

In consequence of the fact that the soft steel extends up to the upper edge of the head of the rail, the liability of the rails to break will be considerably reduced since the hard steel insert occupies a small part only of the cross sectional area of the rail and, first of all, since the edges of the hard steel insert are embraced by the soft steel.

Another point of great importance is the fact that in addition to the reduction of the danger of breakage of the rails proper, also the danger of breakage of the welded rail-joints will be considerably reduced, since the cross sectional areas of the rail ends to be welded together, which consist of wear resisting hard steel, will have been reduced to a very large extent if designed according to the invention. On the other hand, the presence of large proportions of soft steel in the head of the rail makes it possible to weld also the head portions of the joints in a satisfactory and enduring way.

Furthermore, the invention has the great advantage that also in bending the new rails the danger of breakage will be considerably reduced since the hard steel will be rigidly held in position within the soft steel.

Furthermore, a very advantageous feature of the new rail consists in the fact that it is now possible to weld fish-plates also to the head of the rail by means of welding seams, since the parts of the head of the rail adjacent to the fish-plates consist of soft steel having excellent welding properties, whereas heretofore the said fish-plates could be welded to the foot only of the rail, for the reason that the parts of the head of the rail adjoining the fish-plates were composed of hard steel having poor welding properties.

Finally, the relative large sized weld at the junction of the two grades of steel, as a result of the soft steel having been extended along the outer surfaces of the head portion up to the top of the rail, will bring in its train a considerable reduction of the danger of breakage in the new steel rails, whereas the weld of the old type of steel rails which was positioned at about the juncture of the head and the web portion, by reason of its small size, caused breakage of the rails in many instances.

The present invention is of particular importance in connection with the welding of Vignoles rails, apart from the welding of grooved rails, since the state railways of all countries, as a result of increased speed and concurrent higher wheel pressure as well as the heavy wear incident thereto, will gradually introduce the steel rails of the two-part welded type, since hard standard steel rails will certainly fail to meet future requirements in consequence of their great liability to breakage.

In the accompanying drawings two embodiments of the invention are shown.

Figure 2:
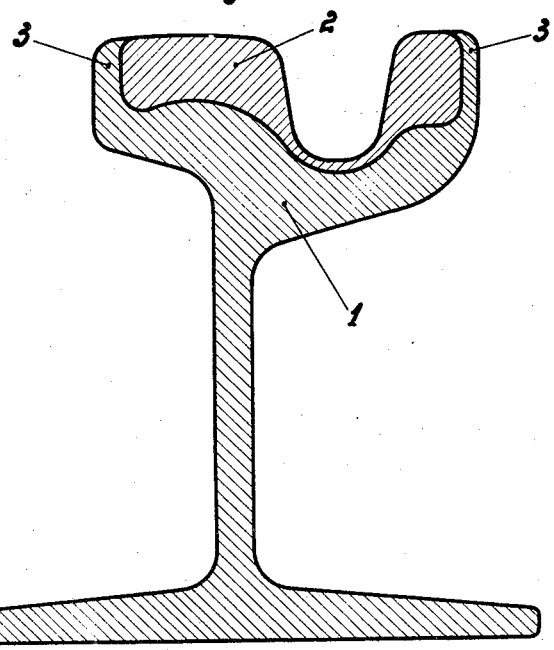

Fig. 1 shows a Vignoles rail and
Fig. 2 shows a grooved rail of compound steel.

The web portion, foot and part of the head in both embodiments consist of soft steel 1, whereas only the running surface or the running surface and the inner surface of the guard-lip which is subjected to wear, is composed of hard steel 2. The hard and soft steels, as will be understood, are welded together.

The soft steel 1, in the shape of web-like ribs, extends along the outer surface of the head or along the outer surface of the guard-lip up to the top of the rail, thus embracing the hard steel which forms only the zones subjected to wear. 4 designates the rolling mark at the Vignoles rail which, in the illustrated embodiment, is fixed on the side of the running edge. After the running edge of such a Vignoles rail has been worn down, the latter, after dressing, may be further used in inverted position on sidings.

Having thus described my invention what I claim as new and desire to secure by Letters Patent is:

1. A rail structure, wherein the rail head has a wear resisting zone consisting of hard steel which forms with the other part of the rail consisting of soft steel a single inseparable unit, characterized by the fact that the soft steel forms the foot and web of the rail also the lower part of the rail head and extends in the form of a web along the outer surfaces of the head and parts of the head respectively up to the upper edge of the rail head thus embracing the wear resisting zone formed of hard steel.

2. A rail structure including a two part body formed as a single inseparable unit and shaped to form a foot, a web and a head, one part being formed of hard steel and constituting a wear resisting zone in the upper part of the head, the other part forming the foot and web of the rail body as well as the lower part of the rail head and extends along the outer surface of the hard steel part of the head and up to the upper edge thereof so as to embrace the said wear resisting hard steel part.

In testimony whereof I affix my signature.
HEINRICH KURZ.